March 6, 1973 F. E. BOOTH, JR 3,719,808

LINEAR DIGITAL-TO-ANALOG CONVERTER

Original Filed July 12, 1968 6 Sheets-Sheet 1

INVENTOR
FREDERICK E. BOOTH, JR.

Hill, Sherman, Meroni, Gross & Simpson
ATTORNEYS

March 6, 1973 F. E. BOOTH, JR 3,719,808

LINEAR DIGITAL-TO-ANALOG CONVERTER

Original Filed July 12, 1968 6 Sheets-Sheet 2

INVENTOR
FREDERICK E. BOOTH, JR.

Hill, Sherman, Meroni, Gross & Simpson
ATTORNEYS

LINEAR DIGITAL-TO-ANALOG CONVERTER

Original Filed July 12, 1968

INVENTOR
FREDERICK E. BOOTH, JR.
Hill, Sherman, Meroni, Gross & Simpson
ATTORNEYS INVENTOR
FREDERICK E. BOOTH, JR.
Hill, Sherman, Meroni, Gross & Simpson
ATTORNEYS INVENTOR
FREDERICK E. BOOTH, JR.
Hill, Sherman, Meroni, Gross & Simpson
ATTORNEYS INVENTOR
FREDERICK E. BOOTH, JR.
Hill, Sherman, Meroni, Gross & Simpson
ATTORNEYS United States Patent Office 3,719,808
Patented Mar. 6, 1973

3,719,808
LINEAR DIGITAL-TO-ANALOG CONVERTER

Frederick E. Booth, Jr., Weston, Conn., assignor to Hendaille Industries Inc., Buffalo, N.Y.

Continuation of abandoned application Ser. No. 744,561, July 12, 1968. This application Feb. 22, 1971, Ser. No. 117,835
Int. Cl. H03k *13/02*
U.S. Cl. 235—154 3 Claims

ABSTRACT OF THE DISCLOSURE

A numerical control system having a reversible binary counter and associated digital to analog converter stages wherein command numbers are loaded into the counter in two's complement binary notation but wherein the sign representing counter stage drives its converter stage to provide an increment of analog output in response to a positive command number to provide a linear analog output in the vicinity of zero count.

RELATED APPLICATIONS

This application is a continuation of Ser. No. 744,561, filed July 12, 1968, now abandoned.

SUMMARY OF THE INVENTION

An important object of the invention is to provide a numerical control system wherein displacement commands which are registered in two's complement binary notation are linearly converted to analog values for both positive and negative commands near zero.

Other objects, features and advantages will be apparent from the following detailed description taken in connection with the accompanying drawings.

DESCRIPTION OF THE PREFERRED EMBODIMENT

Figure 1A:
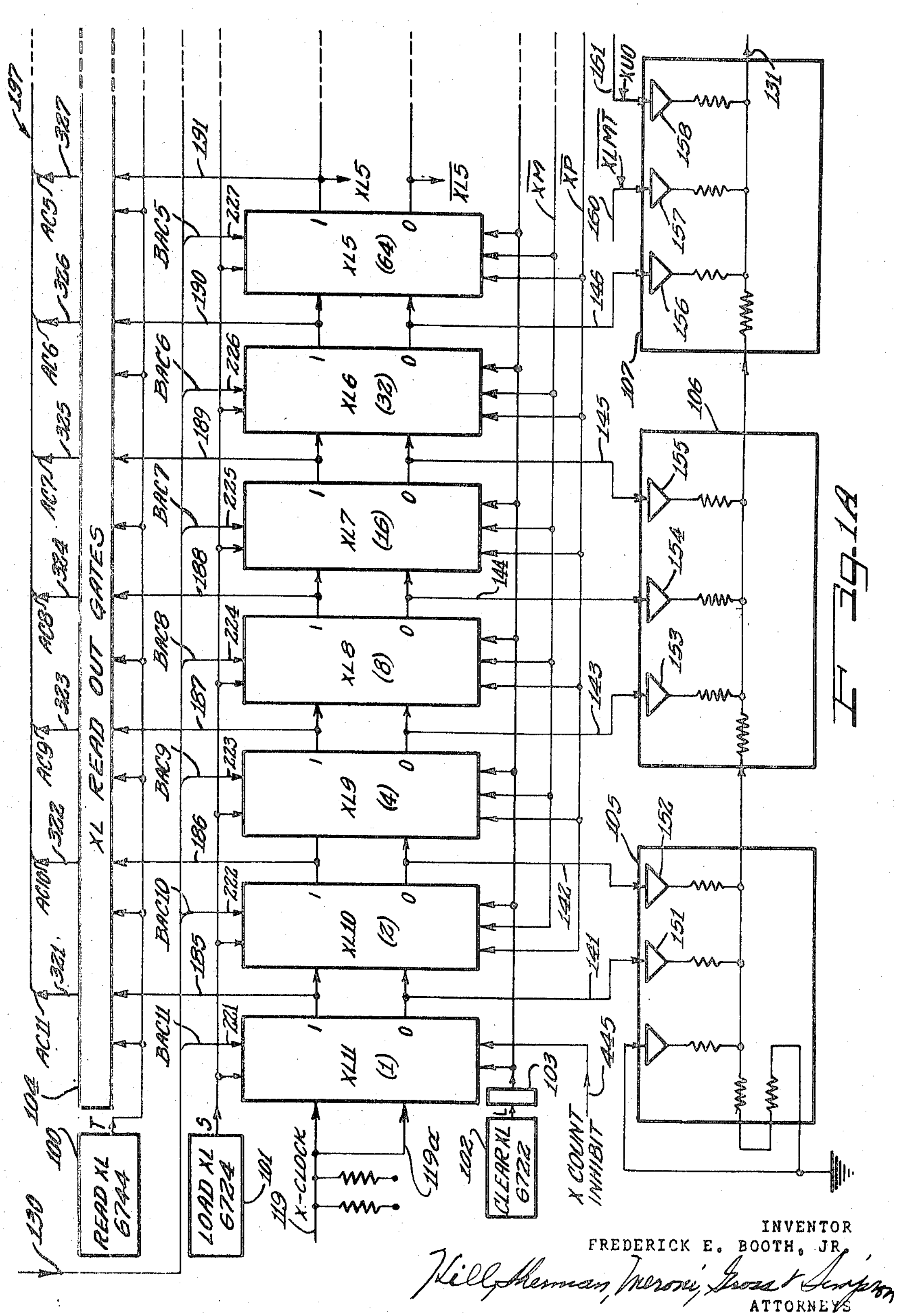
FIGS. 1A and 1B show the X axis control circuits of a numerical positioning control system in accordance with the present invention, FIG. 1B being a continuation of FIG. 1A to the right, and dash lines being utilized to represent stages which have been omitted.

By way of introduction to the circuitry of a preferred embodiment in accordance with the present invention, the components shown in the successive figures of drawings have been assigned respective general reference numerals, and a brief description of each such component is given in the following tabulations. The components of each figure have in general been assigned three digit reference numerals wherein the first or most significant digit of the reference numeral corresponds to the figure number (the reference numerals in FIGS. 1A and 1B beginning at 100, those in FIG. 2 beginning with 200 and so forth), except that the same component appearing in successive drawing figures has received the same reference numeral. The tabulations also refer to a suitable commercial source where the component is commercially available, or otherwise identify or explain the structure of the component.

Figure 1B:
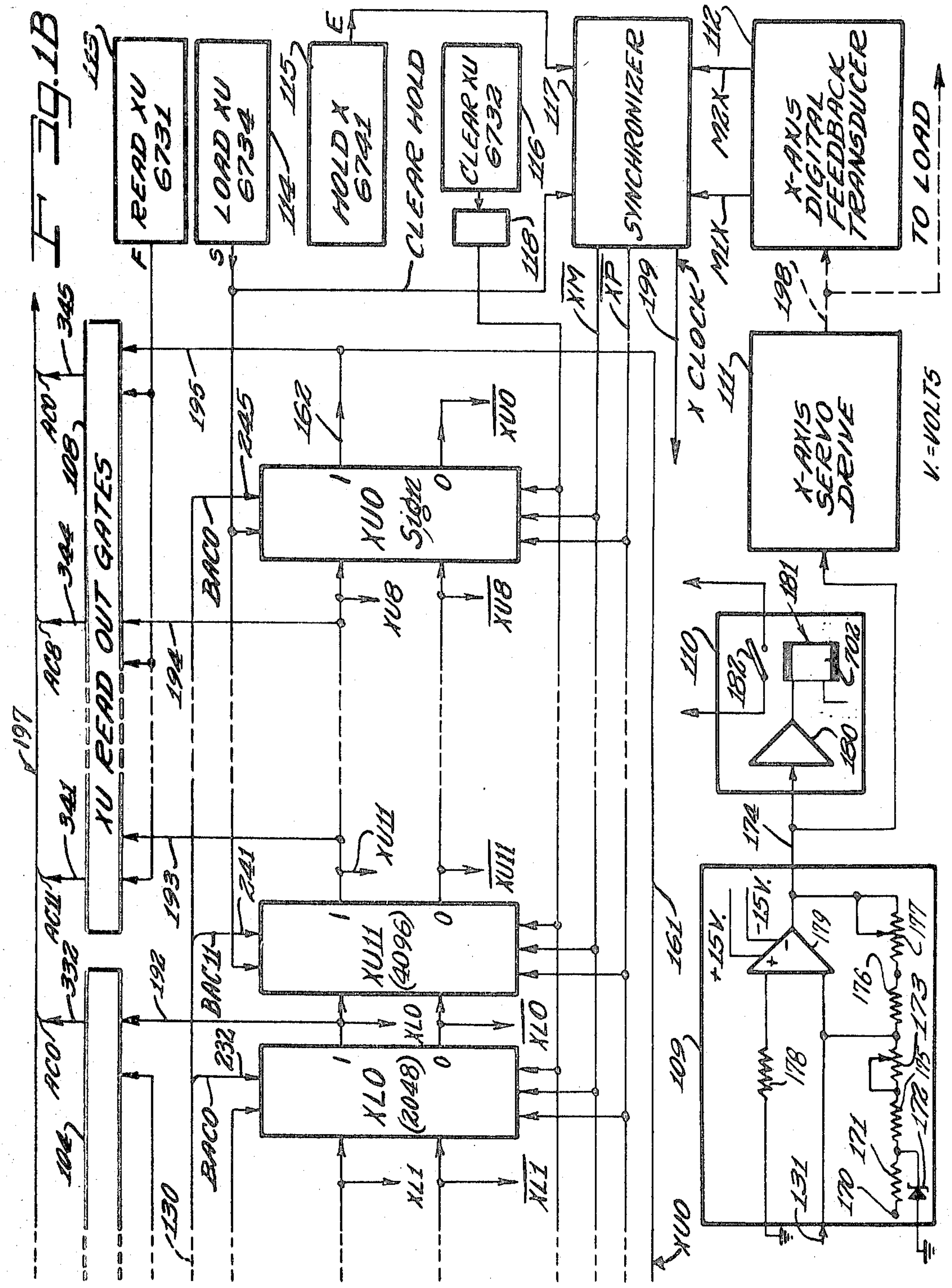

TABLE I (Figs. 1A and 1B)

Figure 4:
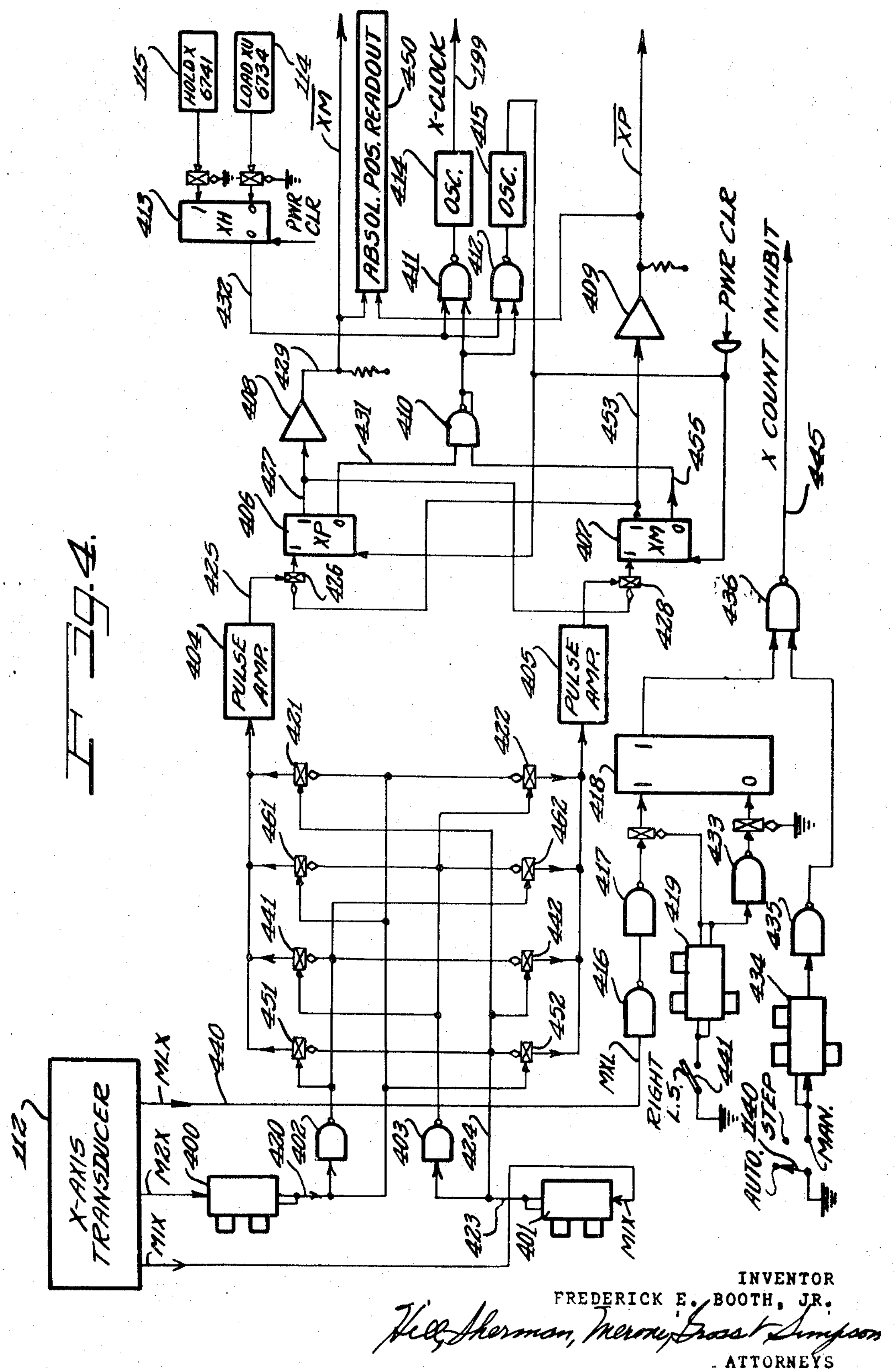
FIG. 4 is a schematic diagram showing details of the X axis synchronizer component of FIG. 1B, and also showing the circuitry controlling the X count inhibit line of FIG. 1A, and the connections to an absolute position readout device for the X-axis.
Figure 7:
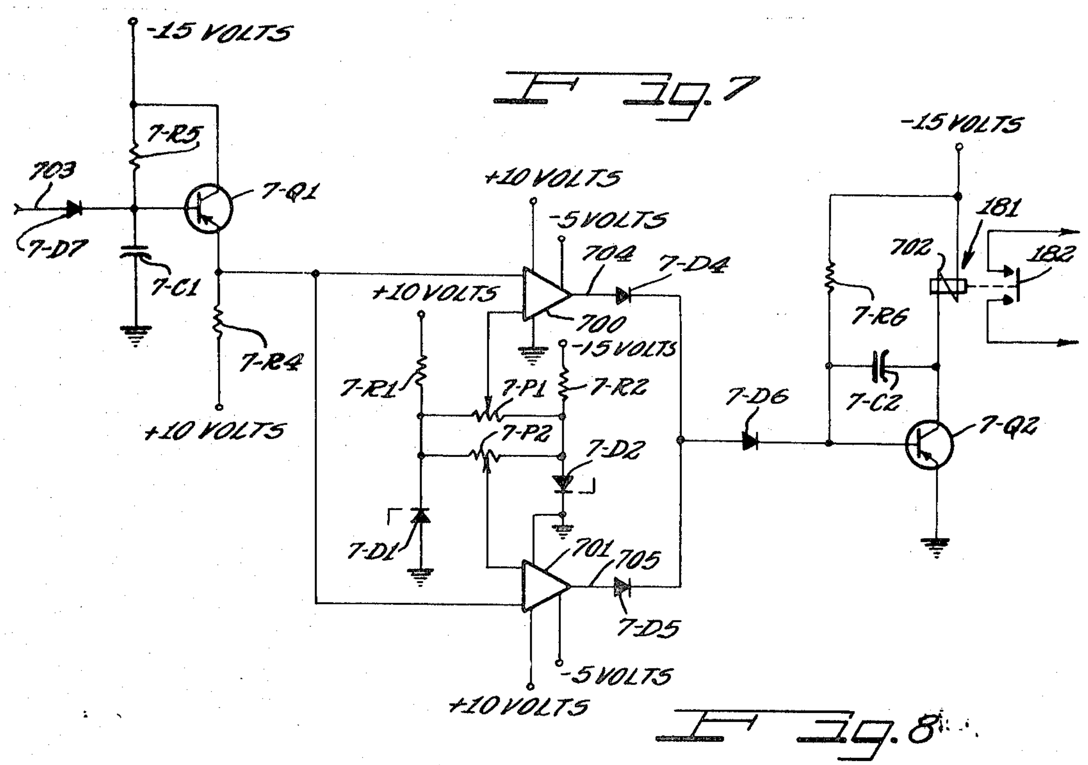
FIG. 7 is a schematic electric circuit diagram showing the circuit utilized for actuating the X-axis and Y-axis null detector relays, the circuit for the X-axis being specifically shown.

| Reference character identifying component | Description of component | Reference to figure showing circuit, or identification of suitable commercial source [1] |
|---|---|---|
| XLO–XL11 XU8–XU11, XU0. | Binary up-down counter (See DEC–A,[2] pps. 39 and 40, which is incorporated herein by reference.) | R201 (17 required). |
| 100 | Read XL selector (Code 6744). | W103.[3] |
| 101 | Load XL selector (Code 6724). | W103. |
| 102 | Clear XL selector (Code 6722). | W103. |
| 103 | Pulse amplifier | R602. |
| 104 | XL read out gates | R123 (2 required). |
| 105, 106, 107 | Digital-analog converter | A601 (3 required). |
| | —10 volt reference supply | A702. |
| 108 | XU readout gates | R123. |
| 109 | Operational amplifier | Fig. 1B. |
| 110 | Null detector | Fig. 7. |
| 111 | X-axis servo drive | Part of present numerically controlled positioning systems.[4] |
| 112 | X-axis feedback transducer | Do.[5] |
| 113 | Read XU selector (code 6731) | W103. |
| 114 | Load XU selector (code 6734) | W103. |
| 115 | Hold X selector (code 6741) | W103. |
| 116 | Clear XU selector (code 6732) | W103. |
| 117 | Synchronizer (X-axis) | Fig. 4. |
| 118 | Pulse amplifier | R602. |

[1] Available as a module with the indicated designation from Digital Equipment Corporation, Maynard, Mass., U.S.A. unless otherwise specified.

[2] DEC–A refers to The Digital Logic Handbook published by Digital Equipment Corporation, 1967 edition (404 pps.).

[3] One is required unless otherwise specified. In certain instances one commercial component will contain duplicate circuits.

[4] The servo drive utilized a General Electric Company direct current servo motor. The servo drive is furnished by the Strippit Division of Houdaille Industries, Inc., Akron, N.Y., U.S.A., with its Fabramatic Model 15/30 punch presses.

[5] The feedback transducer is of the photovoltaic type. An amplifier is preferably provided within the transducer housing such as the module W501A of the Digital Equipment Corporation to limit sensitivity to noise pickup. (The W501A module is the same as the W501 except for the addition of a jumper wire from a junction point between diodes D9 and D10, to the anode terminal of diode D4, having reference to the Digital Equipment Corporation drawing RS–B–W501–5 copyright 1964.) The transducer is of the type furnished with the Fabramatic punch presses referred to above.

Figures 2, 3:
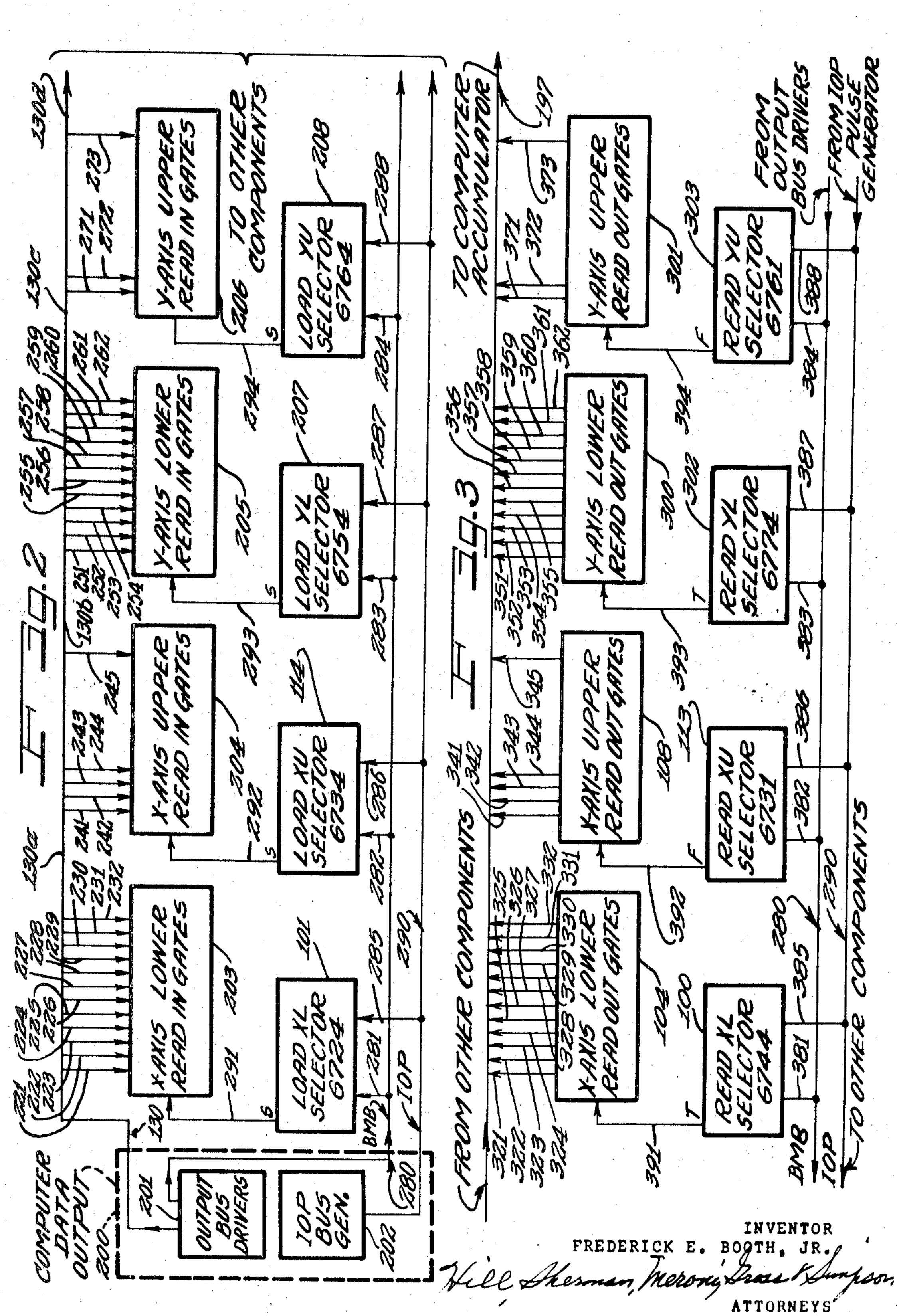
FIG. 2 is a diagrammatic illustration showing means for controlling the transfer of digital command signals from a stored program digital computer to the X and Y control circuits of a plurality of machine tools.
FIG. 3 is a diagrammatic illustration similar to FIG. 2 but showing the means for transferring data from the control circuits of the machines to the computer.

TABLE II (Fig. 2)

| Component Ref. No. | Component description | Identification of suitable source [1] |
|---|---|---|
| 200 | Computer data output circuits (See DEC-B,[3] pps. 88, 89 and 424-427, all of which is incorporated herein by reference.) | Part of PDP-8.[2] |
| 201 | Outut bus drivers | Do. |
| 202 | IOP (Input-Output Pulse) Pulse Generator. | Do. |
| 203 | X-axis lower read-in gates | Part of R201 (12 required). |
| 204 | X-axis upper read-in gates | Part of R201 (5 required). |
| 205 | Y-axis lower read-in gates | Part of R201 (12 required). |
| 206 | Y-axis upper read-in gates | Part of R201 (3 required). |
| 207 | Load YL selector (code 6754) | W103. |
| 208 | Load YU selector (code 6764) | W103. |

[1] Available from Digital Equipment Corporation unless otherwise specified.
[2] The PDP-8 is a stored-program digital computer available from Digital Equipment Corporation.
[3] DEC-B refers to The Digital Small Computer Handbook published by Digital Equipment Corporation, 1967 edition (494 pages).

TABLE III (Fig. 3)

| Reference number identifying component | Description of component | Identification of suitable DEC [1] module |
|---|---|---|
| 300 | Y-axis lower read out gates | R123 (2 required). |
| 301 | Y-axis upper read out gates | R123. |
| 302 | Read YL selector (code 6774) | W103. |
| 303 | Read YU selector (code 6761) | W103. |

[1] DEC is used herein to refer to the Digital Equipment Corporation, Maynard, Mass., U.S.A.

TABLE IV (Fig. 4)

| Component ref. No. | Component description | Figure reference or source identification |
|---|---|---|
| 400, 401 | Negative input converter and Schmitt trigger circuits. | W501A (2 required). |
| 402, 403 | Inverter circuits | R107. |
| 404, 405 | Pulse amplifiers each using four diode-capacitor-diode gate circuits (See DEC-A, pages 29 and 30, which is incorporated herein by reference). | R601 (2 required). |
| 406, 407 | XP and XM flip-flops (bistable circuits) each using one diode-capacitor-diode gate circuit at its set input. | R202. |
| 408, 409 | Inverter amplifiers | W051. |
| 410, 411, 412 | NAND/NOR Gates (negative input NAND, positive input NOR). | R111. |
| 413 | XH flip-flop with two diode-capacitor-diode gate circuits. | R202. |
| 414 | Relaxation oscillator triggered by a positive input pulse for supplying a positive output pulse after a 27 microsecond delay. | Like the oscillator of Fig. 8. |
| 415 | Relaxation Oscillator triggered by a positive input pulse for supplying a positive (clearing) pulse after a 32 microsecond delay. | Do. |
| 416, 417 | Inverters | R107. |
| 418 | Flip-Flop with two diode-capacitor-diode gates at its inputs. | R202. |
| 419 | Negative input converter and Schmitt trigger. | W501. |
| 433 | NAND/NOR gate | R111. |
| 434 | Negative input converter and Schmitt trigger. | W501. |
| 435 | Inverter | R107. |
| 436 | NAND/NOR Gate | R111. |
| 450 | Binary coded decimal up/down counter providing a visual decimal readout of absolute X-axis position. (There is a similar counter associated with the Y-axis circuits which are analogous to the X-axis circuits.) | Janus Control Corporation. |

Figures 5, 6:
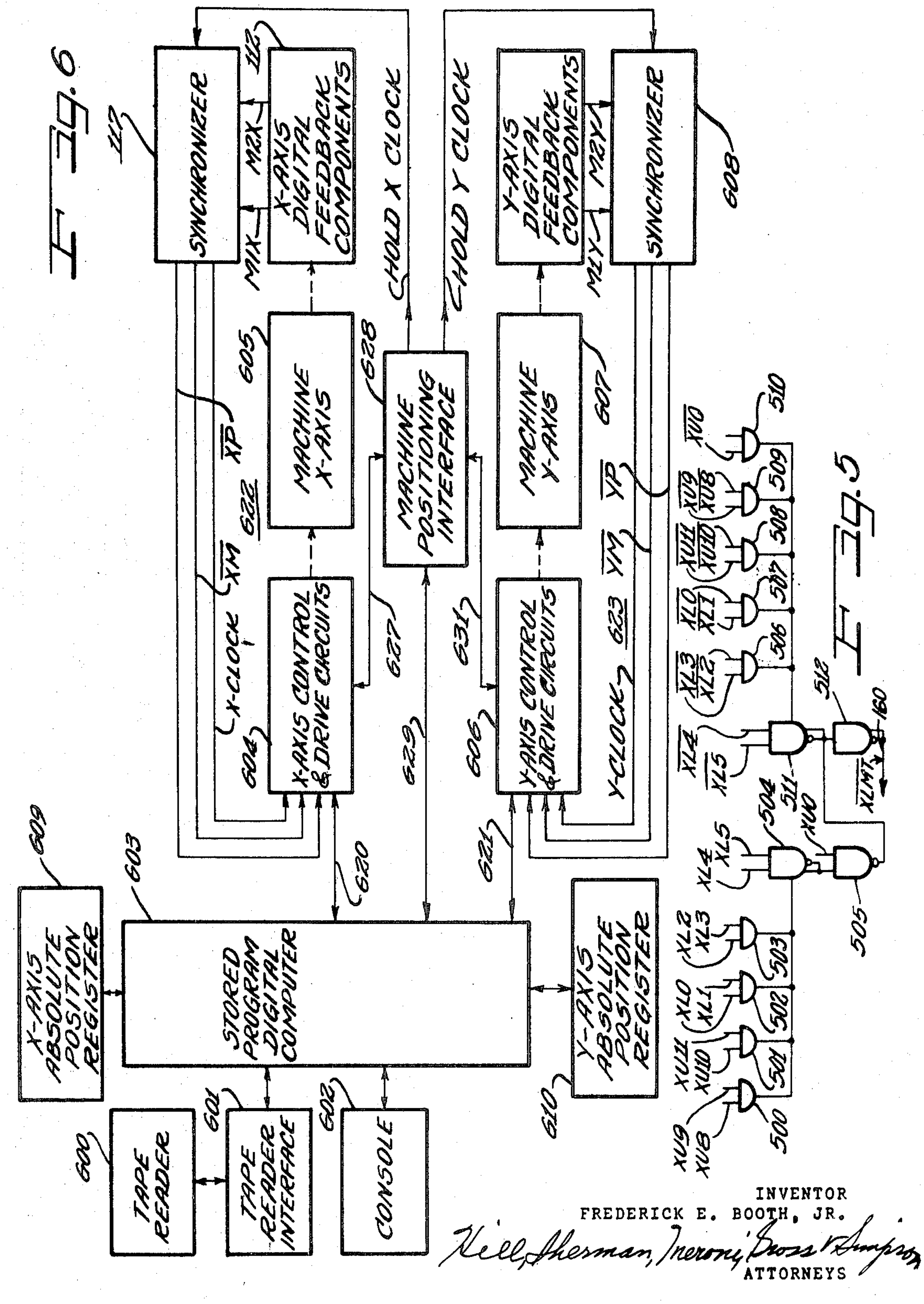
FIG. 5 is a diagrammatic showing of a limit gate circuit associated with the system of FIGS. 1A and 1B.
FIG. 6 is a block diagram illustrating an overall numerical control system and method in accordance with the present invention.

TABLE V (Fig. 5)

| Component ref. No. | Description of component | DEC module designation |
|---|---|---|
| 500-503 | Diode networks | R002. |
| 504, 505 | Expandable NAND/NOR gates, with diode networks 500-503 connected to node terminal F of Gage 504. | R111. |
| 506-510 | Diode networks | R002. |
| 511, 512 | Expandable NAND/NOR gates, with diode networks 506-510 connected to node terminal F of gate 511. | R111. |

TABLE VI (Fig. 6)

| Component ref. No. | Component description | Identification of commercial source, or figure reference |
|---|---|---|
| 600 | High speed punched tape reader. | Digitronics B-3000 Paper tape reader. |
| 601 | Tape reader control and interface. | Fig. 10. |
| 602 | Keyboard-printer and tape reader-punch console (See DEC-B, pps. 128-131 and pps. 207-210, and 288-291, all of which is incorporated herein by reference.) | Teletype Model 33 ASR Console. |
| 603 | Stored program digital computer with random access core memory, and providing priority rated, interrupt operation. (See DEC-B, pps. 81-109, 203-206, all of which is incorporated herein by reference.) | Digital Equipment Corporation Programmed Data Processor-8 (PDP-8). |
| 604 | X-axis control and drive circuits. | Figs. 1A, 1B, 2, 3, and 5. |
| 605 | Machine X-axis | X-axis of Strippit Fabramatic Model 15/30 punch press. |
| 606 | Y-axis control and drive circuits (corresponds to component 604 except for number of stages required). | Figs. 2 and 3. |
| 607 | Machine Y-axis | Y-axis of Strippit Fabramatic Model 15/30 punch press. |
| 608 | Synchronizer (Y-axis) | Corresponds to Fig. 4. |
| 609 | X-axis absolute position register located within the computer memory (double precision arithmetic may be used). | PDP-8 core memory (24 bits). |
| 610 | Y-axis Absolute Position Register located within the computer memory (double precision arithmetic may be used). | Do. |
| 611 | Y-axis digital feedback components. | Corresponds to X-axis component 112. See Table I. |

TABLE VII (FIG. 7)—NULL DETECTOR CIRCUIT 110

| Element reference character: | Type or value |
|---|---|
| 7-D7 | 1N3604. |
| 7-R5 | 10K.[1] |
| 7-C1 | 150 pf.[2] |
| 7-Q1, 8-Q2 | 2N3638. |
| 7-R4 | 6.2K. |
| 7-R1 | 510 ohms. |
| 7-D1 | IN702. |
| 7-P1 | Potentiometer (0 to 1K). |
| 7-P2 | Do. |
| 7-R2 | 750 ohms. |
| 7-D2 | IN702. |
| 7-D4, 7-D5 | IN3604. |
| 7-D5 | Do. |
| 7-R6 | 7.5K. |
| 7-C2 | 1 microfarad. |
| 700 | Comparator.[3] |
| 701 | Do. |
| 702 | Relay coil of relay **181**, FIG. 1B. |

[1] Throughout this disclosure, the abbreviation K stands for kilohms.
[2] pf. stands for picofarads (micromicrofarads).
[3] Fairchild Camera and Instrument Corp. Model A710.

TABLE VIII (FIG. 8)—RELAXATION OSCILLATOR 1108

| Element reference character: | Type or value |
|---|---|
| 8–R8 | 10K. |
| 8–R9 | 100,000 ohms.[1] |
| 8–R10 | 20,000 ohms.[1] |
| 8–C2 | 1 microfarad.[1] |
| 8–C3 | Zero (an open circuit).[1] |
| 8–R7 | 100 ohms. |
| 8–Q3 | 2N1671. |
| 8–R6 | 22 ohms. |
| 8–C1 | .01 microfarad. |
| 8–R5 | 15K. |
| 8–Q2 | 2N3638. |
| 8–R4 | 7.5K. |
| 8–CR4 | IN3604. |
| 8–CR3 | IN3604. |
| 8–R3 | 100K. |
| 8–R2 | 7.5K. |
| 8–Q1 | 2N3638. |
| 8–CR2 | IN3604. |

[1] The values of 8–R9, 8–R10, 8–C2 and 8–C3 determine the time constant of the circuit.

OPERATION OF FIGS. 1A AND 1B

In operation of the components of FIGS. 1A and 1B, digital command signals from the accumulator (AC) of computer 603 (FIG. 6) are supplied via bus cable 130. As indicated by reference characters applied to conductors branching from the cable 130, the input gates of counter stages XL11 and XU11 are connected with the BAC11 output from component 201, FIG. 2, of the computer output circuits 200. The read in gates for stages XL11 through XL0 are represented by block 203 in FIG. 2, and the read in gates for stages XU11, XU10, XU9, XU8 and XU0 are represented by component 204 in FIG. 2. The BAC10 terminal of the computer is connected with stages XL10 and XU10, the terminal BAC9 is connected with XL9 and XU9, and the terminal BAC8 is connected with XL8 and XU8. The terminals BAC7 through BAC1 are connected with counter sages XL7, XL6, XL5, XL4, XL3, XL2 and XL1, respectively. The BAC0 terminal of the computer is connected with the input gate of counter stage XL0 and also with the input gate of counter stage XU0, both shown in FIG. 1B.

Thus, when the load XL component 101 is selected by virtue of the output of component 201, FIG. 2, the gates 203, FIG. 2, will be enabled to load digital command signals from the computer into the XL counting stages. Similarly when the load XU component 114 is selected, digital command data will be loaded into the XU counting stages of FIG. 1B.

When a positioning cycle is then initiated, an error signal will be generated at the output 131 of the digital to analog converter stages 105–107 which will determine the direction and speed of operation of the X-axis servo drive 111. As shown in FIG. 1A, the complement outputs of stages XL11–XL6 are supplied via lines 141–146 to the inputs of the converter stages. The circuitry specifically referred to in Table I is such that when XL11 is clear, conductor 141 is held at minus 3 volts so as to provide a zero volt output from amplifier 151. On the other hand, when the counting stage XL11 is set, the output at line 141 is at ground potential, and amplifier 151 supplies a predetermined voltage increment with respect to the output line 131. If this output voltage increment is arbitrarily assigned a value of unity, then the outputs of amplifiers 152–158 would have relative values of 2, 4, 8, 16, 32, 64, and 128, respectively.

Conductor 160 leading to the input of amplifier 157 of converter stage 107 is connected to the output of inverter 512, FIG. 5. Conductor 161 leading to the input of amplifier 158 of converter stage 107 connects with the set output line 162 of counting stage XU0. Thus if stage XU0 is set, line 161 is at a potential of minus 3 volts and amplifier 158 contributes nothing to the output voltage at 131. On the other hand, if counting stage XU0 is in a clear (or reset) condition, then the output at line 161 will be at ground potential, and amplifier 158 will supply its relative voltage increment of 128. It will be observed that the connection 161 to the set output of counting stage XU0 differs from the connection of conductors 141–146 to the clear or complement output terminals of stages XL11–XL6.

The purpose of the illustrated connections to the respective counting stages and the desired functioning of the limit gate circuitry of FIG. 5 will be apparent from the following tabulations entitled Table A1, Table A2, Table B1 and Table B2 which show the operation of the circuits of FIGS. 1A and 1B for the case of a positive digital command signal and for the case of a negative digital command signal from the computer. The Tables A1, A2 and B1, B2 will be referred to in a collective sense as Tables A and B, respectively.

TABLE A1

Operation of Counting Stages of Figs. 1A and 1B for a Positive Digital Command Signal From the Computer

| | XL stages | | | | | | | | | | | | XU stages | | | | |
|---|---|---|---|---|---|---|---|---|---|---|---|---|---|---|---|---|---|
| Decimal count | 11[1] | 10 | 9 | 8 | 7 | 6 | 5 | 4 | 3 | 2 | 1 | 0 | 11 | 10 | 9 | 8 | 0 |
| 2048 | 0 | 0 | 0 | 0 | 0 | 0 | 0 | 0 | 0 | 0 | 0 | 1 | 0 | 0 | 0 | 0 | 0 |
| 1024 | 0 | 0 | 0 | 0 | 0 | 0 | 0 | 0 | 0 | 0 | 1 | 0 | 0 | 0 | 0 | 0 | 0 |
| 512 | 0 | 0 | 0 | 0 | 0 | 0 | 0 | 0 | 0 | 1 | 0 | 0 | 0 | 0 | 0 | 0 | 0 |
| 255 | 1 | 1 | 1 | 1 | 1 | 1 | 1 | 1 | 0 | 0 | 0 | 0 | 0 | 0 | 0 | 0 | 0 |
| 128 | 0 | 0 | 0 | 0 | 0 | 0 | 0 | 1 | 0 | 0 | 0 | 0 | 0 | 0 | 0 | 0 | 0 |
| 127 | 1 | 1 | 1 | 1 | 1 | 1 | 1 | 0 | 0 | 0 | 0 | 0 | 0 | 0 | 0 | 0 | 0 |
| 64 | 0 | 0 | 0 | 0 | 0 | 0 | 1 | 0 | 0 | 0 | 0 | 0 | 0 | 0 | 0 | 0 | 0 |
| 63 | 1 | 1 | 1 | 1 | 1 | 1 | 0 | 0 | 0 | 0 | 0 | 0 | 0 | 0 | 0 | 0 | 0 |
| 32 | 0 | 0 | 0 | 0 | 0 | 1 | 0 | 0 | 0 | 0 | 0 | 0 | 0 | 0 | 0 | 0 | 0 |
| 31 | 1 | 1 | 1 | 1 | 1 | 0 | 0 | 0 | 0 | 0 | 0 | 0 | 0 | 0 | 0 | 0 | 0 |
| 3 | 1 | 1 | 0 | 0 | 0 | 0 | 0 | 0 | 0 | 0 | 0 | 0 | 0 | 0 | 0 | 0 | 0 |
| 2 | 0 | 1 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| −1 | 1 | 1 | 1 | 1 | 1 | 1 | 1 | 1 | 1 | 1 | 1 | 1 | 1 | 1 | 1 | 1 | 1 |
| −2 | 0 | 1 | 1 | 1 | 1 | 1 | 1 | 1 | 1 | 1 | 1 | 1 | 1 | 1 | 1 | 1 | 1 |
| −3 | 1 | 0 | 1 | 1 | 1 | 1 | 1 | 1 | 1 | 1 | 1 | 1 | 1 | 1 | 1 | 1 | 1 |
| −31 | 1 | 0 | 0 | 0 | 0 | 1 | 1 | 1 | 1 | 1 | 1 | 1 | 1 | 1 | 1 | 1 | 1 |
| −32 | 0 | 0 | 0 | 0 | 0 | 1 | 1 | 1 | 1 | 1 | 1 | 1 | 1 | 1 | 1 | 1 | 1 |
| −63 | 1 | 0 | 0 | 0 | 0 | 0 | 1 | 1 | 1 | 1 | 1 | 1 | 1 | 1 | 1 | 1 | 1 |
| −64 | 0 | 0 | 0 | 0 | 0 | 0 | 1 | 1 | 1 | 1 | 1 | 1 | 1 | 1 | 1 | 1 | 1 |

[1] Stage XL11 which is the first stage of the counting chain is shown at the left in Fig. 1A, and for this reason is shown at the left in the tables, even though it represents the least significant digit position in interpreting the binary number in the counter. The binary digit 0 is represented when the associated stage is in the clear or reset condition, and the binary digit 1 is represented by a counting stage when the stage is in the set condition.

TABLE A2

Operation of Converter Stages of Figs. 1A and 1B And the Limit Gate of Fig. 5 For a Positive Digital Command Signal From the Computer

| | Converter stages | | | | | | | | |
|---|---|---|---|---|---|---|---|---|---|
| Decimal count | 151 (1)[1] | 152 (2)[1] | 153 (4)[1] | 154 (8)[1] | 155 (16)[1] | 156 (32)[1] | 157 (64)[1] | 158 (128)[1] | Net analog error (with bias = −128[1] |
| 2048 | 0 | 0 | 0 | 0 | 0 | 0 | (1) | (1) | +64 |
| 1024 | 0 | 0 | 0 | 0 | 0 | 0 | (1) | (1) | +64 |
| 512 | 0 | 0 | 0 | 0 | 0 | 0 | (1) | (1) | +64 |
| 255 | 1 | 1 | 1 | 1 | 1 | 1 | (1) | (1) | +127 |
| 128 | 0 | 0 | 0 | 0 | 0 | 0 | (1) | (1) | +64 |
| 127 | 1 | 1 | 1 | 1 | 1 | 1 | (1) | (1) | +127 |
| 64 | 0 | 0 | 0 | 0 | 0 | 0 | (1) | (1) | +64 |
| 63 | 1 | 1 | 1 | 1 | 1 | 1 | (0) | (1) | +63 |
| 32 | 0 | 0 | 0 | 0 | 0 | 1 | (0) | (1) | +32 |
| 31 | 1 | 1 | 1 | 1 | 1 | 0 | (0) | (1) | +31 |
| 3 | 1 | 1 | 0 | 0 | 0 | 0 | (0) | (1) | +3 |
| 2 | 0 | 1 | 0 | 0 | 0 | 0 | (0) | (1) | +2 |
| 1 | 1 | 0 | 0 | 0 | 0 | 0 | (0) | (1) | +1 |
| 0 | 0 | 0 | 0 | 0 | 0 | 0 | (0) | (1) | 0 |
| −1 | 1 | 1 | 1 | 1 | 1 | 1 | (1) | (0) | −1 |
| −2 | 0 | 1 | 1 | 1 | 1 | 1 | (1) | (0) | −2 |
| −3 | 1 | 0 | 1 | 1 | 1 | 1 | (1) | (0) | −3 |
| −31 | 1 | 0 | 0 | 0 | 0 | 1 | (1) | (0) | −31 |
| −32 | 0 | 0 | 0 | 0 | 0 | 1 | (1) | (0) | −32 |
| −63 | 1 | 0 | 0 | 0 | 0 | 0 | (1) | (0) | −63 |
| −64 | 0 | 0 | 0 | 0 | 0 | 0 | (1) | (0) | −64 |

[1] The output of the digital to analog converter is expressed as a relative magnitude taking the output of the converter stage 151 as unity.

TABLE B1

Operation of the Counting Stages of Figs. 1A and 1B For a Negative Digital Command Signal From the Computer

| | XL stages | | | | | | | | | | | | XU stages | | | | |
|---|---|---|---|---|---|---|---|---|---|---|---|---|---|---|---|---|---|
| Decimal count | 11[1] | 10 | 9 | 8 | 7 | 6 | 5 | 4 | 3 | 2 | 1 | 0 | 11 | 10 | 9 | 8 | 0 |
| −2048 | 0 | 0 | 0 | 0 | 0 | 0 | 0 | 0 | 0 | 0 | 0 | 1 | 1 | 1 | 1 | 1 | 1 |
| −1024 | 0 | 0 | 0 | 0 | 0 | 0 | 0 | 0 | 0 | 0 | 1 | 1 | 1 | 1 | 1 | 1 | 1 |
| −512 | 0 | 0 | 0 | 0 | 0 | 0 | 0 | 0 | 0 | 1 | 1 | 1 | 1 | 1 | 1 | 1 | 1 |
| −256 | 0 | 0 | 0 | 0 | 0 | 0 | 0 | 0 | 1 | 1 | 1 | 1 | 1 | 1 | 1 | 1 | 1 |
| −128 | 0 | 0 | 0 | 0 | 0 | 0 | 0 | 1 | 1 | 1 | 1 | 1 | 1 | 1 | 1 | 1 | 1 |
| −64 | 0 | 0 | 0 | 0 | 0 | 0 | 1 | 1 | 1 | 1 | 1 | 1 | 1 | 1 | 1 | 1 | 1 |
| −63 | 1 | 0 | 0 | 0 | 0 | 0 | 1 | 1 | 1 | 1 | 1 | 1 | 1 | 1 | 1 | 1 | 1 |
| −32 | 0 | 0 | 0 | 0 | 0 | 1 | 1 | 1 | 1 | 1 | 1 | 1 | 1 | 1 | 1 | 1 | 1 |
| −31 | 1 | 0 | 0 | 0 | 0 | 1 | 1 | 1 | 1 | 1 | 1 | 1 | 1 | 1 | 1 | 1 | 1 |
| −3 | 1 | 0 | 1 | 1 | 1 | 1 | 1 | 1 | 1 | 1 | 1 | 1 | 1 | 1 | 1 | 1 | 1 |
| −2 | 0 | 1 | 1 | 1 | 1 | 1 | 1 | 1 | 1 | 1 | 1 | 1 | 1 | 1 | 1 | 1 | 1 |
| −1 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 0 | 0 | 0 | 0 |
| +1 | 1 | 0 | 0 | 0 | 0 | 0 | 0 | 0 | 0 | 0 | 0 | 0 | 0 | 0 | 0 | 0 | 0 |
| +2 | 0 | 1 | 0 | 0 | 0 | 0 | 0 | 0 | 0 | 0 | 0 | 0 | 0 | 0 | 0 | 0 | 0 |
| +3 | 1 | 1 | 0 | 0 | 0 | 0 | 0 | 0 | 0 | 0 | 0 | 0 | 0 | 0 | 0 | 0 | 0 |
| +31 | 1 | 1 | 1 | 1 | 1 | 0 | 0 | 0 | 0 | 0 | 0 | 0 | 0 | 0 | 0 | 0 | 0 |
| +32 | 0 | 0 | 0 | 0 | 0 | 1 | 0 | 0 | 0 | 0 | 0 | 0 | 0 | 0 | 0 | 0 | 0 |
| +63 | 1 | 1 | 1 | 1 | 1 | 1 | 0 | 0 | 0 | 0 | 0 | 0 | 0 | 0 | 0 | 0 | 0 |

[1] Stage XL11 which is the first stage of the counting chain is shown at the left in Fig. 1A, and for this reason is shown at the left in the Tables, even though it represents the least significant digit position in interpreting the binary number in the counter. The digit 0 is represented when the associated stage is in the clear or reset condition, and the binary digit 1 is represented by a counting stage when the stage is in the set condition.

TABLE B2

Operation of the Converter Stages of Figs. 1A and 1B and the Limit Gate of Fig. 5 for a Negative Digital Command Signal From the Computer.

| | Converter stages | | | | | | | | |
|---|---|---|---|---|---|---|---|---|---|
| Decimal count | 151 (1)[1] | 152 (2)[1] | 153 (4)[1] | 154 (8)[1] | 155 (16)[1] | 156 (32)[1] | 157 (64)[1] | 158 (128)[1] | Net analog error (with bias=−128[1]) |
| −2048 | 0 | 0 | 0 | 6 | 0 | 0 | (0) | (0) | −128 |
| −1024 | 0 | 0 | 0 | 0 | 0 | 0 | (0) | (0) | −128 |
| −512 | 0 | 0 | 0 | 0 | 0 | 0 | (0) | (0) | −128 |
| −256 | 0 | 0 | 0 | 0 | 0 | 0 | (0) | (0) | −128 |
| −128 | 0 | 0 | 0 | 0 | 0 | 0 | (0) | (0) | −128 |
| −64 | 0 | 0 | 0 | 0 | 0 | 0 | (1) | (0) | −64 |
| −63 | 1 | 0 | 0 | 0 | 0 | 0 | (1) | (0) | −63 |
| −32 | 0 | 0 | 0 | 0 | 0 | 1 | (1) | (0) | −32 |
| −31 | 1 | 0 | 0 | 0 | 0 | 1 | (1) | (0) | −31 |
| −3 | 1 | 0 | 1 | 1 | 1 | 1 | (1) | (0) | −3 |
| −2 | 0 | 1 | 1 | 1 | 1 | 1 | (1) | (0) | −2 |
| −1 | 1 | 1 | 1 | 1 | 1 | 1 | (1) | (0) | −1 |
| 0 | 0 | 0 | 0 | 0 | 0 | 0 | (0) | (1) | 0 |
| +1 | 1 | 0 | 0 | 0 | 0 | 0 | (0) | (1) | +1 |
| +2 | 0 | 1 | 0 | 0 | 0 | 0 | (0) | (1) | +2 |
| +3 | 1 | 1 | 0 | 0 | 0 | 0 | (0) | (1) | +3 |
| +31 | 1 | 1 | 1 | 1 | 1 | 0 | (0) | (1) | +31 |
| +32 | 0 | 0 | 0 | 0 | 0 | 1 | (0) | (1) | +32 |
| +63 | 1 | 1 | 1 | 1 | 1 | 1 | (0) | (1) | +63 |

[1] The output of the digital analog converter is expressed as a relative magnitude taking the output of the converter stage 151 as unity.

It will be observed from a consideration of Tables A and B that amplifiers 157 and 158 of converter stage 107 are switched in such a way that for high positive counts above plus 63, the relative output from the converter stages at line 131 is maintained at a relatively high value, for example above a limit value of plus 63. Between a count of plus 63 and minus 64, the output at 131 varies as a linear function of the count in the counting stages. For counts below about minus 64, the output at 131 is maintained at an absolute value above the limit value of about 64. Further, it will be observed that as the count in the counting stages increases from plus 63 to plus 127, the output at 131 continues to increase in a linear fashion. For a count of 128, however, the output at 131 falls to a value of plus 64 on a relative scale previously referred to. As the count further increases, the output at 131 again linearly increases to a maximum value of 127. This fluctuation in the output at 131 continues as the count in the counter stages continues to increase so long as the counting stage XU0 remains in the clear condition, and thus supplies an analog output of plus 128 which is substantially equal to the bias of minus 128 in the relative units which is introduced at amplifier component 109. Similarly, as the count in the counting stages progresses below minus 64, the analog output at 131 will linearly increase in the negative direction until a count of minus 128. At a count of minus 129, the output at 131 abruptly decreases to minus 64. Further counting in the negative direction leads to a further linear change in analog output voltage until a count of minus 256 is reached. At a count of minus 257, the output at 131 again abruptly decreases to minus 64. It will be observed, however, that beyond a count of plus 63 and beyond (in the negative direction) a count of minus 64, the net analog voltage at output 131 never falls below an absolute value of approximately 63 in the relative units previously referred to.

Referring to circuit 109 in FIG. 1B, a bias reference voltage of plus 10 volts may be introduced at point 170. One terminal of a resistor 171 is connected to circuit point 170, and a Zener diode 172 is connected between the other terminal of resistor 171 and ground. A 1000 ohm potentiometer 173 may be adjusted with a count of zero registered in the counting stages so as to provide a zero analog output at 174 under these conditions. The values of the circuit elements in component 109 may be as follows: resistor 171, 510 ohms; voltage rating of Zener diode 172, 5.6 volts; zero adjustment potentiometer 173, 0 to 1000 ohms; resistor 175, 470 ohms; resistor 176, 100 ohms; gain adjustment potentiometer 177, 0 to 5,000 ohms; and resistor 178, 500 ohms. Amplifier component 179 may be a Burr Brown Model 1507 operational amplifier.

Null detector component 110 includes an amplifier circuit 180 which is adjustable by means of two potentiometers (7–P1 and 7–P2, FIG. 7) to actuate relay 181 whenever the input to the amplifier circuit 180 remains within a predetermined range about the zero error value. Thus one adjustment potentiometer of component 110 may adjust a first comparator (comparator 700, FIG. 7) of circuit 180 to provide an enabling output level whenever the input potential corresponds to a count in the counting stages of less than plus three, while the second adjustment potentiometer may adjust a second comparator (comparator 701, FIG. 7) to provide an enabling output level whenever the count in the counting stages is greater than minus 3. Thus when both comparators 700 and 701 provide an enabling output level, the count will be between plus three and minus three. The normally open contacts 182 of relay 181 when closed may enable an energizing circuit for a relaxation oscillator (oscillator 1108, FIG. 8) which is adjusted to respond only when the energizing circuit remains closed for a predetermined time interval such as 100 milliseconds. Thus, if the count in the counting stages remains between plus 3 and minus 3 for 100 milliseconds, for example (and if the Y null detector contact is closed during the interval), the relaxation oscillator will become operative to discontinue the positioning cycle.

Because of the operation of the null detector circuitry, it is possible for the machine axis to come to a stop with a count other than zero registered in the counting stages. The count remaining in the counting stages may be determined so as to be well within the tolerance requirements of the machine tool, and yet with many successive positioning steps, it is conceivable that the absolute error of a later end point with respect to a fixed reference point would be unacceptable. To deal with this possibility, provision is made for the computer to read the condition of the counting stages when the axis has stopped. The computer could be programmed in a number of different ways to take care of the problem, but in the illustrated embodiment, provision is made for the computer processor to algebraically combine the remainder in the counting stages with a succeeding command so as to provide a modified command signal to the control circuits which will correct for the error in the previous positioning operation.

For the purpose of determining the condition of the counting stages after the machine axis has stopped, the counting stages are provided with output lines such as those indicated at 186–195 leading from the set output lines of stages XL11–XL5, XL0, XU11, XU8 and XU0. Similar output lines would be provided for stages XL4, XL3, XL2, XL1, XU10 and XU9. The XL output lines such as 185–192 lead to an XL Read Out Gates component 104 controlled by a Read XL component 100. The XU Read Out Gates component 108 receives the output lines such as 193–195 of the XU counting stages and is controlled by the Read XU component 113. As indicated by the reference characters applied to the output lines of the XL Read Out Gates component 104, cable 197 connects with terminals AC11 through AC0 of the computer accumulator. Similarly the output lines from the XU Read Out Gates component 108, FIG. 1B, lead to terminals AC11, AC10, AC9, AC8 and AC0, respectively. The gate components 104 and 108 are, of course, enabled on different cycles so that the computer can distinguish the AC11 output of gate 104 from the AC11 output of gate 108, for example.

In the foregoing description, certain output lines which connect with the same terminal of the computer have been identified with a reference character indicating this fact. Specifically the designations AC0 through AC11, and BAC0 through BAC11 have this significance. Individual reference numerals have also been applied to the respective conductors bearing the more general reference character designations. It is believed that this procedure will facilitate comprehension of the drawings by those skilled in the art. Similarly in the following description the outputs from the XL and XU counting stages have been designated by the same reference characters as used for the respective counting stages. Thus, in FIG. 1A, an output line from the "set" output terminal of counter stage XL5 has been designated by the reference character XL5, while the output from the "clear" terminal of counting stage XL5 has been designated with the symbol for the complement of XL5 ($\overline{XL5}$). (Referring to FIG. 1A, it will be observed that line 191 is connected to a common circuit point with line XL5 at the "set" output of counting stage XL5.) Certain other conductors have been given a general character designation and a reference numeral designation as well. See for example conductors 160 and 161 at the lower right in FIG. 1A.

Referring to the lower part of FIG. 1B, the output line 174 from amplifier 109 is connected to the input of the X-axis servo drive component 111 whose mechanical output is indicated by dash line 198. The transducer component 112 may be of the photoelectric type and include a suitable preamplifier so as to supply square waveform signals at the output lines M1X and M2X leading to synchronizer 117. The synchronizer component will enable the line designated as the complement of XM ($\overline{XM}$) if the transducer is rotating in one direction and will enable the line designated as the complement of XP ($\overline{XP}$) if the transducer is being driven in the opposite direction. The synchronizer 117 will also supply an X clock pulse at line 199 for each increment of rotation of the transducer 112. By way of example, the transducer may be mechanically coupled to the output shaft 198 in such a way as to produce an X clock pulse for each increment of rotation corresponding to a linear displacement of the machine axis of .001 inch. The X clock pulses from the synchronizer are supplied to the input of counting stage XL11 which is arranged so that each clock pulse causes the counting stage to change its state. The stage XL11 thus acts in the manner of a toggle switch or binary counting stage. If the line $\overline{XM}$ is enabled, the counting stages will count in the "up" or positive direction. On the other hand if the line $\overline{XP}$ is enabled, the "set" output of each counting stage is effectively coupled to the next succeeding counting stage so that the counting stages will count in the "down" or minus direction.

The Hold X component 115 causes synchronizer 117 to interrupt the supply of X clock pulses for a sufficient interval to ensure that the counting stages may be inspected by the computer. The "hold" interval introduced by actuation of component 115 is sufficiently short, however, so that any feedback pulse from transducer 112 which might occur during this interval could only be blocked for a portion of its duration. Thus even if a slight movement of the feedback transducer occurred during the hold interval, the count in the counting stages would reflect such movement. (Further details of the "Hold X" operation will be apparent from the circuit shown in FIG. 4 and described below.)

After the computer has read out the condition of the counting stages with the machine axis essentially stopped, the computer will actuate Clear XL component 102 and the Clean XU component 116 to reset the counter to a zero reading in preparation for the transfer of a new digital command signal. Of course, if the read out from the counter shows an error in excess of tolerance, the computer may be programmed to delay clearing the counter, and to enable the servo drives for an additional interval.

OPERATION OF FIGS. 2 AND 3

In FIG. 2, the BAC output bus 130 has been indicated as leading to input conductors 221–232 of gate component 203. These same reference numerals have been applied in FIG. 1A and FIG. 1B to assist in correlation of these figures. Input conductors 221–227 as shown in FIG. 1A are also designated by reference characters BAC11 through BAC5 to indicate that these conductors are connected by means of cable 130 with terminals BAC11 through BAC5 of component 201, FIG. 2. Similarly, conductor 232 in FIG. 1B has also been designated by the reference character BAC0 which is the terminal to which this conductor connects at component 201. The input conductors to gate component 204 in FIG. 2 have been designated by reference numerals 241–245 and lead, respectively, to terminals BAC11, BAC10, BAC9, BAC8 and BAC0. In practice, the cable 130 may lead to a connector at the component 203, and a further cable such as indicated at 130*a* may lead from component 203 to component 204, while cable 130*b* may lead from component 204 to component 205, cable 130*c* may lead from component 205 to 206, and cable 130*d* may lead to a further component of a second machine tool, for example. By actuating components 203, 204, 205, 206 and subsequent corresponding components in sequence, a desired number of components may all connect with terminals BAC11 through BAC0 of component 201. Thus, conductors 251–262 of gate 205 would connect with terminals BAC11 through BAC0 of component 201 and conductors 271–273 of component 206 would connect with terminals BAC11, BAC10 and BAC0 of component 201.

The manner of selection of gates such as 203–206 in sequence is explained in detail in The Digital Small Computer Handbook (cited in Table II, supra) at pages 429 and 430, and a specific circuit is disclosed for components 101, 114, 207, and 208 in The Digital Logic Handbook (cited in Table I, supra) at page 142, and these disclosures are incorporated herein by reference. In general, the BMB cable 280 from component 201 (or two multi-conductor cables are represented by line 280) may contain at least 12 conductors. Lines 281–284 may represent connections from one of each of six pairs of conductors of cable 280 to components 101, 114, 207 and 208, for example. The memory buffer register of the computer may have bits 3–8 thereof connected at both the binary 1 and binary 0 outputs thereof to the component 201, and cable 280 may connect with terminals MB3(1) through MB8(1) and MB3(0) through MB8(0) of component 201. The corresponding outputs of component 201 would be BMB3(1) through BMB8(1) and BMB3(0) through BMB8(0). It may be noted that the convention used for the selectors herein is to use the middle two digits of the code numbers of the selectors to indicate the octal complement of the BMB selection pattern. The final digit indicates whether a 10T1, 10T2 or 10T4 pulse is supplied. The initial 6 in the code indicates an input/output selection signal. Thus the selector 101 with a code of 6724 would be addressed on BMB cable 280 by a selection code of 72 (octal), with the final digit 4, indicating that a 10T4 is to be transmitted. Thus, taking the selection code for component 101 as 72 (octal), the following terminals would be connected to component 101 via cable 281: BMB3(0), BMB4(0), BMB5(0) and BMB6(1), BMB7(0), BMB8(1). To give one further example, if the code for component 114 is 73 (octal), the cable 282 would connect with the following terminals: BMB3(0), BMB4(0), BMB5(0) and BMB6(1), BMB7(0), BMB8(0). It is evident that any number of additional device selectors may be assigned two digit octal codes (up to a total of 63 in decimal notation). The operation of each of the selector components such as 101, 114, 207, 208 in FIG. 2 and such as 100, 113, 302 and 303 in FIG. 3 will be apparent from the foregoing description.

In FIG. 2, branch cables are indicated at 285–288 leading from 10P cable 290 to selectors 101, 114, 207 and 208, respectively. The cable 290 is connected to the output of a 10P bus generator component 291 of the computer, and the cable 290 may comprise three conductors carrying respective pulses 10P1, 10P2, and 10P4 as described, for example, in The Digital Small Computer Handbook, supra, at pages 88–90, pages 221–223, and pages 426–427, and this description is incorporated herein by reference. The device selector components when enabled regenerate the respective 10P pulses as 10T command pulses. The positive or negative version of any of the successive regenerated pulses 10T1, 10T2 or 10T4 may be supplied via output lines such as indicated at 291–294 in FIG. 2. The output terminals in FIG. 2 to which conductors 291–294 are connected are designated by letters which correspond to the distinctive letters in the terminal designations utilized in the commercially available module W103. Thus, terminal S of selector 101 may supply an initially positive-going version of the 10T4 pulse, the T terminal of selector 100 may supply an initially negative-going 10T4 pulse, for example, and the terminal F of selector 113 may supply an initially negative-going 10T1 pulse. The timing of the 10T cycle is shown at page 425 of The Digital Small Computer Handbook, supra, and this disclosure is incorporated herein by reference.

In FIG. 3, the reference numeral 197 designates generally the cable extending between the accumulator terminals AC11 through AC0 of the computer and the successive gate components such as 104, 108, 300 and 301. As mentioned with reference to cable 130, the cable 197 may actually comprise successive lengths of multiconductor cable, for example connecting from component 301 to the computer, connecting between components 300 and 301, connecting between components 108 and 300, and connecting between components 104 and 108. Further lengths of cable may connect gate component 104 with gate components for other axes or for the axes of other machines, or separate buffering may be utilized in conjunction with a separate cable directly from the computer as will be apparent to those skilled in the art.

In FIG. 3 the conductors leading from components 104, 108, 300 and 301 have been assigned reference numerals 321–332, 341–345, 351–362 and 371–373. The reference numerals 321–327, 332 and 341, 344 and 345 have been applied to the corresponding conductors in FIGS. 1A and 1B. Conductors 321–332 connect with terminals AC11 through AC0 of the computer, conductors 341–344 connect with terminals AC11 through AC8, conductor 345 connects with terminal AC0, conductors 351 through 362 connect with terminals AC11 through AC0, conductors 371 and 372 connect with terminals AC11 and AC10, and conductor 373 connects with terminal AC0.

The structure and function of conductor cables 385–388 and conductors 391–394 in FIG. 3 will be apparent from the comparable discussion with respect to cables 285–288 and conductors 291–294 of FIG. 2.

OPERATION OF FIG. 4

In FIG. 4, 90 degree out of phase rectangular waveforms arive at lines M1X, M2X from the digital feedback transducer 112, FIG. 1B. The function of the synchronizer circuit is to energize output line $\overline{XM}$ (complement) for one direction of rotation of the transducer, and to enable the output line $\overline{XP}$ (complement) for the opposite direction of rotation of the transducer. For one direction of rotation of the transducer the input at M2X leads the input at M1X by 90 degrees, and for the other direction of rotation of the transducer, the input at M1X leads the input at M2X by 90 degrees. If a positive signal level first appears at conductor 420 in a cycle of operation, for example, gates 421 and 422 will be enabled. A subsequent positive going signal at 423 is then transmitted via line 424 to the pulse input of gate 421, and a negative going pulse at the input of pulse amplifier 404 generates a positive pulse at line 425 leading to gate 426. Gate 426 is enabled if flip-flop 407 is clear, and a negative pulse is transmitted to the set input of flip-flop 406 placing this flip-flop in a set condition. The result is a negative output level at conductor 427 which serves to disable gate 428 at the input of flip-flop 407. The negative level at the input of driver amplifier 408 results in an enabling level at the output conductor 429 connected with conductor $\overline{XM}$ (complement). The setting of flip-flop 406 produces a positive going pulse at output line 431 leading to NOR gate 410, which thus supplies a negative going pulse to NAND gates 411 and 412. With flip-flop 413 in a clear condition, output line 432 thereof is negative enabling gates 411 and 412. Gates 411 and 412 thus transmit positive going pulses to the relaxation oscillator components 414 and 415. If the oscillator 414 supplies a positive going output pulse after a delay of 27 microseconds, while the component 415 supplies a positive output pulse after a delay of 32 microseconds, the result will be the transmission of a clock pulse of 5 microsecond duration to output conductor 199. When the output of component 415 goes positive, it serves to clear flip-flop 406, disabling line $\overline{XM}$ (complement) and supplying a negative potential at line 431 which is transmitted by gates 410 and 411 to shut off oscillator 414 and place the circuit in condition for a further cycle.

If now the negative going portion of the waveform at 420 leads the negative going portion of the waveform at 423, gates 441 and 442 will be enabled, and the negative going waveform at 423 will be transmitted by inverter 403 as a positive going pulse, resulting in a negative going pulse at the output of gate 441. Thus, output line $\overline{XM}$ (complement) will continue to be enabled, causing the counting chain of FIGS. 1A and 1B to count up. Thus, the operation of the circuit continues so long as the transducer component 112, FIG. 1B, continues to rotate in the same direction.

If the direction of rotation of the transducer reverses, the waveform at 423 will go positive (to ground potential) 90 degrees ahead of the waveform at 420, enabling gates 451 and 452. The subsequent positive going pulse of the waveform at 420 is transmitted by gate 452 as a negative pulse triggering pulse amplifier 405 and serving to place flip-flop 407 in the set condition. In this case, output line 453 is driven negative to place line $\overline{XP}$ (complement) in enabling condition, and thus causing the counter to count down. At the same time, the positive or ground level output at conductor 455 is transmitted by NOR gate 410 and by NAND gates 411 and 412 to trigger oscillators 414 and 415 and generate a further clock pulse at line 199. Similarly, on the next half cycle of the waveforms at 420 and 423, gates 461 and 462 will be enabled through inverter components 403, and flip-flop 407 will be again placed in set condition to generate another clock pulse at line 199.

The oscillators 414 and 415 preferably employ the circuit of FIG. 8, but with modified values for circuit elements 8–R9, 8–R10, 8–C2 and 8–C3 as follows: for oscillator 414, total series resistance (8–R9 plus 8–R10) 10,000 ohms, and total shunt capacitance (8–C2 plus 8–C3). .0022 microfarad; for oscillator 415, total series resistance 15,000 ohms, and total shunt capacitance .0022 microfarad.

For the sake of convenience there has been added to the showing of the synchronizer in FIG. 4 a representation of the X-axis transducer circuits component 112 which supplies the M1X and M2X waveforms. The transducer also supplies a pulse MLX upon each complete revolution thereof at a predetermined point. These revolution marker pulses MLX are supplied via a conductor 440 to the input of inverters 416 and 417. The output of the trigger 419 is normally at ground potential to enable the gate at the input of flip-flop 418, so that the pulses from inverter 417 are transmitted to the set input of the flip-flop maintaining the flip-flop in a set condition. When however the carriage of the machine tool approaches the extreme right limit of its travel (along the X axis), the right limit switch 441 is closed and remains closed as the carriage continues its movement to the right. This provides a negative level output from trigger 419 blocking the MLX pulses and placing the flip-flop 418 in a clear condition. The result is a negative potential at the output of gate 436 which disables the input gates in input lines 119 and 119*a* leading to the first counting stage XL11, FIG. 1A. The X count inhibit line has been given the reference designation 445 in FIG. 1A and in FIG. 4. If selector 1140 is placed in the manual position, the output of trigger 434 is at a negative level, the output of inverter 435 is at a ground level, and the output line 445 is at the negative count inhibiting potential regardless of the condition of the right limit switch 441. This circuitry will therefore illustrate the manner in which provision may be made to place the machine tool under manual control.

Where the count has been inhibited because of the operation of the right limit switch 441, the count will be resumed after the carriage releases the limit switch to its open condition and the first marked pulse MLX is received. The carriage is not programmed to move to its extreme limit, so that limit switch 441 would not be closed in the course of the correct execution of a program.

OPERATION OF FIG. 5

In FIG. 5, components 500–504 constitute a negative input NAND gate and a positive input NOR gate, and the same is true of components 506–511. The set outputs of counter stages XU8 through XU11 and XL0 through XY5 are thus connected to one gate circuit, while the complements, the clear outputs of the same counting stages together with the clear output of counting stage XU0 are supplied to the righthand gate circuit shown in FIG. 5. A study of the gate circuitry will reveal that the operation indicated in Tables A1, A2 and B1, B2 will be obtained with this gate arrangement. Thus, for a high positive count, counting stage XU0 will be in a clear condition providing a negative level input at gate 510, while one or more of the other inputs to gates 506–511 will be at ground potential corresponding to a set condition of the associated counting stage. The gate 511 acting as a positive or ground input NOR gate provides a negative level at the input to gate 512. Similarly, with counting stage XU0 clear, the set output XU0 will be at ground potential at the input of gate 505, providing a negative level at the output of gate 505. The negative input to gate 512 results in a ground level output which when supplied to amplifier 157 causes the amplifier to provide an analog voltage increment having a relative value of +64. Thus, even if each of stages XL11 through XL6 is in clear condition, the output at 131 of the converter stages will always be at least plus 64 where the output of amplifier 151 is taken as a relative value of unity.

When the count in the counter is plus 63 or less, all of the counting stages above XL6 will be in a clear condition, providing a negative level input to each of gates 506–511. The result will be a ground level input to gate 512 and a negative level output from gate 512 which serves to switch off converter amplifier stage 157.

When the count in the counter goes to minus 1, counting stage XU0 assumes a set condition, providing a ground level input to gate 510 and a negative output from gate 511. Since all the stages above XL6 will be in set condition, there will be a negative level input to each of gates 500–504, resulting in a ground level output from gate 504 and a negative level output from gate 505. The negative level input to gate 512 results in a ground level output from gate 512 again enabling converter stage 157.

When the counting stages reach a negative value above minus 64, one or more of the counting stages above XL6 will be in a clear condition, providing a ground level input to one of the gates 500–504 and thus a negative level output from gate 504. The set output of XU0 is also negative resulting in a ground level output from gate 505 and a negative level output from gate 512 which serves to disable the converter stage 157.

OPERATION OF FIG. 6

Referring to FIG. 6, computer 603 may have a first stored program therein enabling it to interpret command input numerical positioning data from components 600, 601 so as to transmit the data via communication channels such as generically indicated at 620 and 621 to the upper and lower stages of the X axis and Y axis counting chains. Once these digital command signals have been transmitted to the digital servo loops which are generally designated by the reference numbers 622 and 623, the servo loops are capable of independent functioning in initially driving the respective machine axes 605 and 607 at relatively high speed toward the commanded end points. When the respective axes come within about .063 inch of the respective end points, for example, the digital to analog converter stages of FIG. 1A provide a proportional analog error signal, and the machine axes in response to the diminishing magnitude of the analog error signal progressively slow down the respective axes. The linear region of the converter stage error signal as a function of count is such as to enable an overshoot of for example .063 inch without losing control of the axis. As soon as both axes remain in the vicinity of the required end point for the required time, the null detector components such as X-axis null detector 110, FIG. 1B, signal the computer, for example via channel 627, machine positioning interface component 628 and channel 629. Other operations of the computer 603 may thus be interrupted by means of a program interrupt signal from the interface 628, at which time the computer will energize the axis Hold component such as 115, FIG. 1B and read the contents of the associated counter chain. The stored program then may result in the combining of the remainder read from the counting chain with the new command in such a way as to compensate for any tolerance error in the preceding positioning cycle. Thus, if in the preceding cycle the X-axis had moved one count too far in the positive direction, and the next command were for a positive movement, this one count would be subtracted from the new positive command signal, and the result entered into the X-axis counting chain in the next cycle.

When both axes have sufficiently approached their end points to actuate the associated null detector circuits, the computer 603 is advised, for example via channels 627, 628, 629 and 631, 628, 629. The computer is then in a position to determine if a punch, tool change, or other operation should be initiated before a new positioning cycle takes place.

The computer may have a further stored program so as to enable the generation of new programs from the console 602 simultaneously with the machine control operation. This second stored program may greatly facilitate the generation of new programs, for example by automatically keeping track of block number, storing successive blocks without actually punching the same in a record tape, and advising the operator when he has programmed a move off the piece part. While the program being generated is stored in the memory of the computer, any items thereof may be recalled to the console 602 for modification or checking, and the computer may also provide arithmetical checks and the like. When desired, the operator can then signal the computer to read out the numerical control program so generated from its memory and enter the program on punched tape or the like. It has been found in practice that the assistance of a stored program in the computer during numerical control program preparation greatly speeds this operation.

FIG. 7

FIG. 7 shows the circuit actually employed for the null detector component 110, FIG. 1B. Potentiometers 7–P1 and 7–P2 are adjusted to enable operation of relay 181 for input voltages at 703 of relatively positive and relatively negative values, respectively. To adjust the potentiometers, a signal of the threshold value corresponding to the plus or minus count limit desired is supplied at 703 and an oscilloscope is connected at the relevant test point 704 or 705. The associated potentiometer 7–P1 or 7–P2 is then adjusted until the signal at the test point shifts between a relatively positive potential and a relatively negative potential. Back and forth manual adjustment of the potentiometer in the neighborhood of the correct setting will cause the output at the test point to oscillate between the two potential levels, and the potentiometer may thus be set at substantially the critical setting which corresponds to the threshold level input. As previously described in connection with FIG. 1B, when both comparators 700 and 701 provide an enabling output level, the relay 181 will be energized signifying that the error count is between the desired plus and minus values (such as plus three and minus three).

FIG. 8

Figure 8:
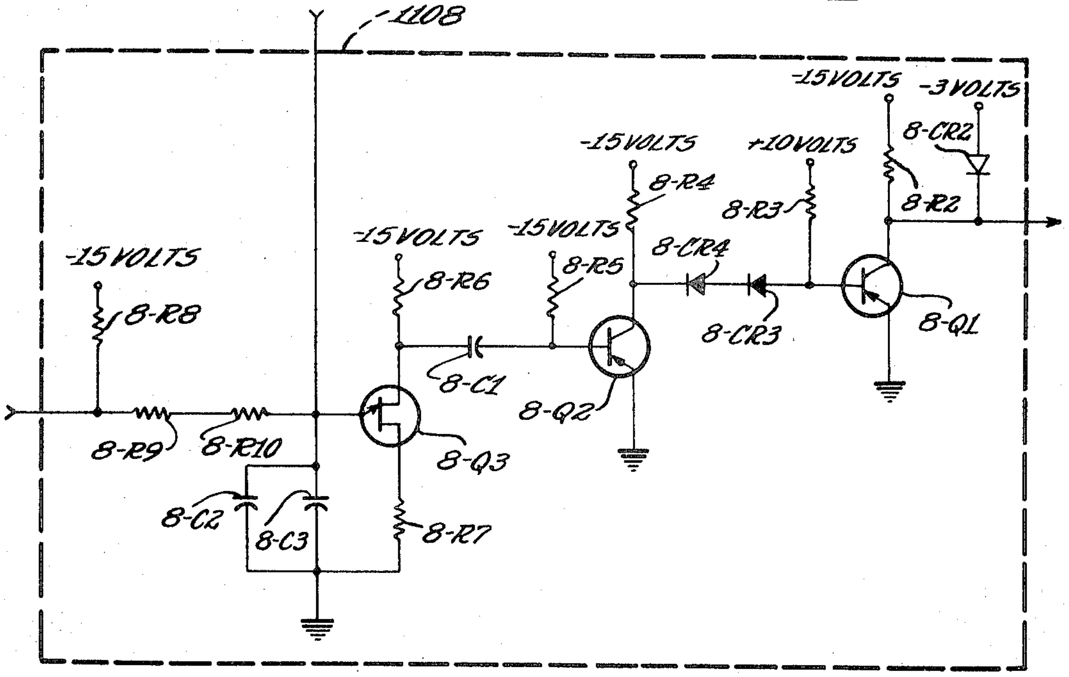
FIG. 8 is an electric circuit diagram showing the details of the relaxation oscillator circuit utilized in various parts of the present system.

FIG. 8 shows an exemplary relaxation oscillator 1108. The oscillators 414 and 415, FIG. 4, have comparable circuits but with components 8–R9, 8–R10, 8–C2 and 8–C3 selected to give the desired time constants for the respective circuits. Oscillators 1108 may be constructed to provide a delay of 100 milliseconds, for example, so as to preclude response in the case of momentary closure of the contacts of the X and Y null detector relays.

EXAMPLES OF COMPUTER OPERATION IN MACHINE CONTROL MODE

The following Tables C1 and C2 will concretely illustrate computer operation to adaptively compensate succeeding commands for any previous positioning errors.

TABLE C1

X-Axis (Positive Error)

| | | | |
|---|---|---|---|
| Error | 0 1 0 0 0 0 0 0 0 0 0 0 : 0 0 0 0 0 | | +2 |
| New Move | 0 0 0 0 1 0 0 0 0 0 0 0 : 0 0 0 0 0 | | +16 |
| Add error and new move for lower X-axis | 0 1 0 0 0 0 0 0 0 0 0 0 | Link | |
| | 0 0 0 0 1 0 0 0 0 0 0 0 | | |
| | 0 1 0 0 1 0 0 0 0 0 0 0 | (0) | |
| | 0 1 0 0 1 0 0 0 0 0 0 0 | | +18 |
| Add upper error and link | 0 0 0 0 0 | | |
| | 0 | | |
| | 0 0 0 0 0 | | |
| Add upper new move and X-axis to error link sum | 0 0 0 0 0 | | |
| | 0 0 0 0 0 | | |
| | 0 0 0 0 0 | | |
| New corrected move | 010010000000/00000 | | |

TABLE C2

X-Axis (Negative Error)

| | | | |
|---|---|---|---|
| Error | 0 1 1 1 1 1 1 1 1 1 1 1 : 1 1 1 1 1 | | −2 |
| New Move | 0 0 0 0 1 0 0 0 0 0 0 0 : 0 0 0 0 0 | | +16 |
| Add error and new move for lower X-axis | 0 1 1 1 1 1 1 1 1 1 1 1 | Link | |
| | 0 0 0 0 1 0 0 0 0 0 0 0 | (1) | |
| | 0 1 1 1 0 0 0 0 0 0 0 0 | | 4 |
| Add upper error and link | 1 1 1 1 1 | | |
| | 1 | | |
| | 0 0 0 0 0 | | |
| Add new move upper X-axis to error link sum | 0 0 0 0 0 | | |
| | 0 0 0 0 0 | | |
| | 0 0 0 0 0 | | |
| New corrected move | 011100000000/00000 | | |

It will be apparent that many modifications and variations may be effected without departing from the scope of the novel concepts of the present invention.

What is claimed is:

1. In a numerical control system, a reversible counter having a succession of counter stages representing respective weights in a coded number system and having a further counter stage connected to the output of the succession of counter stages and adapted to represent a polarity value for a number registered in the counter, a digital to analog converter having a series of converter stages coupled to respective counter stages of said succession of counter stages to provide analog output increments proportional to the succession of weights represented by said counter stages and having a further converter stage coupled to said further counter stage and controlled thereby to provide a further analog output increment corresponding to a higher weighting than the succession of weights represented by said succession of counter stages, said series of converter stages each supplying its respective analog output increment in response to a ONE representing condition of the associated counter stage, and said further converter stage supplying said further analog output increment in response to a POSITIVE representing condition of said further counter stage, and means for introducing a positive displacement command into said counter by setting the stages corresponding to the displacement value in a ONE representing condition and by setting said further counter stage to the POSITIVE representing condition, and for introducing a negative displacement command into said counter by setting the stages to the TWO's complement of the displacement value and by setting said further counter stage to the NEGATIVE representing condition.

2. A numerical control system in accordance with claim 1 with means for introducing a zero displacement command into said counter by setting the series of counter stages in a ZERO representing condition and by setting the further counter stage to the POSITIVE representing condition to provide an analog output from the converter of given polarity and of magnitude equal to said further analog output increment.

3. A numerical control system in accordance with claim 2 with the reversible counter having a number of counter stages exceeding the number of converter stages of said series, means comprising said converter responsive to a zero count in said reversible counter for producing a zero analog error signal, and responsive to positive and negative counts corresponding to values within the capacity of said converter to provide positive and negative error signals respectively which progressively increase in magnitude relative to the zero analog error signal for increasing count magnitude, and means for producing a relatively large analog error signal of polarity corresponding to the polarity of the count in said counter for count values exceeding the capacity of the converter.

References Cited

UNITED STATES PATENTS

| | | | |
|---|---|---|---|
| 3,596,266 | 7/1971 | Slawson | 340—347 DA |
| 3,365,634 | 1/1968 | Centner | 318—600 |
| 3,403,393 | 9/1968 | Skrenes | 340—347 DA |
| 3,447,148 | 5/1969 | Groth | 340—347 DA |
| 3,471,851 | 10/1969 | MacTaggart | 340—347 DA |

THOMAS A. ROBINSON, Primary Examiner

J. GLASSMAN, Assistant Examiner

U.S. Cl. X.R.

340—347 DA